Nov. 8, 1966  S. ISENBERG ETAL  3,284,082
PIN DETECTION BRIDGE CIRCUIT WITH RESONATING DETECTION
LEG AND REACTIVE DIAGONAL ELEMENTS
Filed June 24, 1963  2 Sheets-Sheet 1
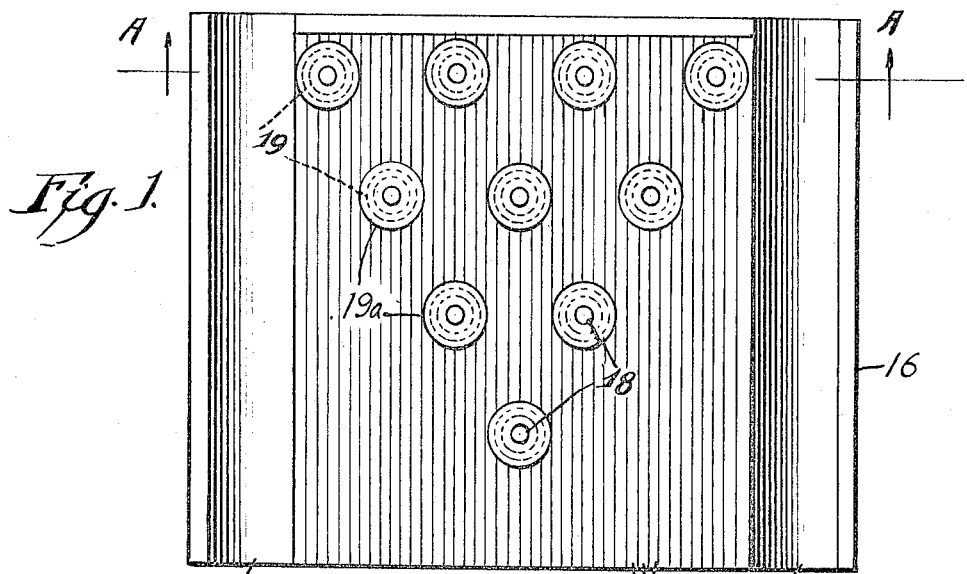
Fig. 1.
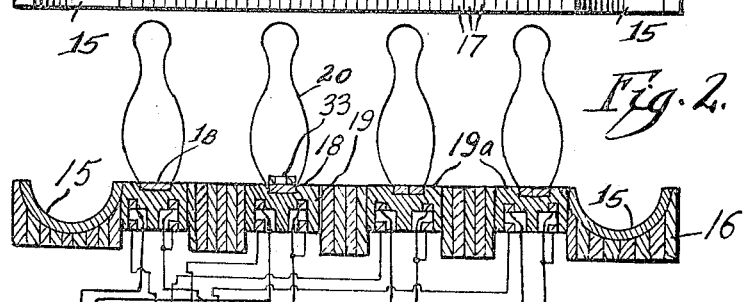
Fig. 2.
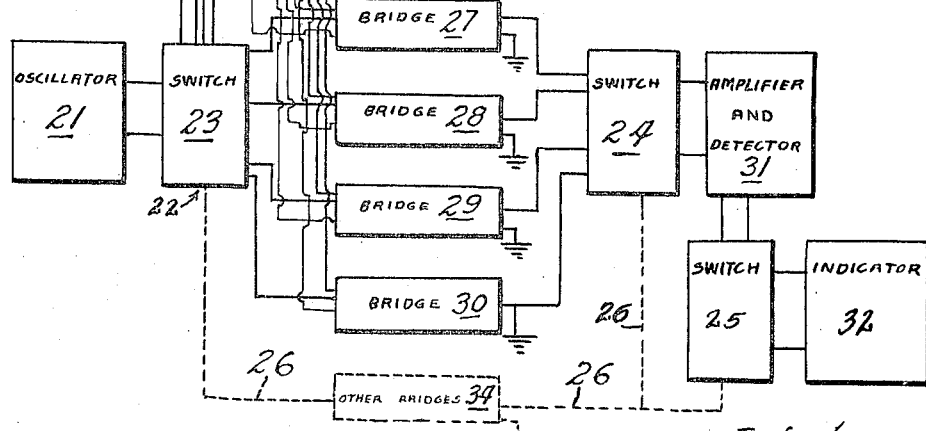
Inventors.
Sompson Isenberg.
Albert E. Shaw.
Robert J. Moon.

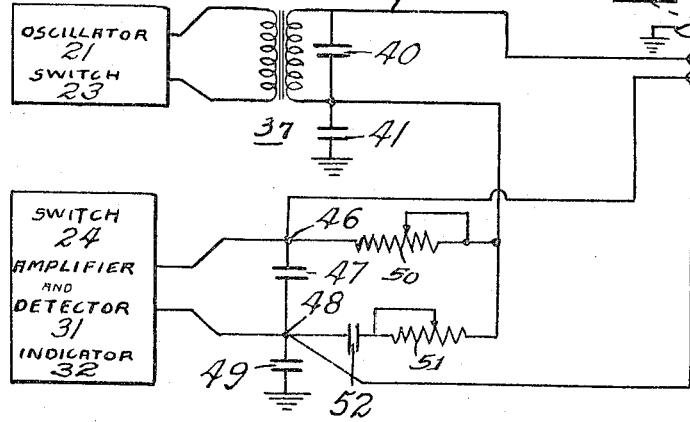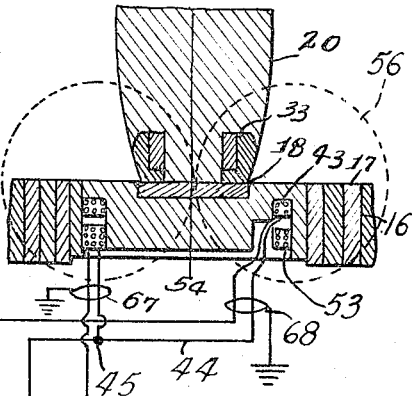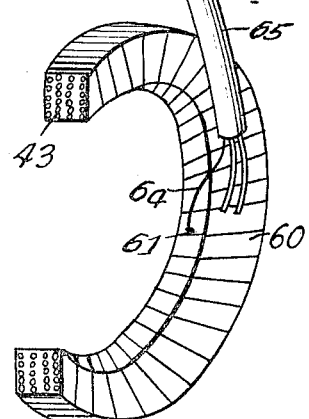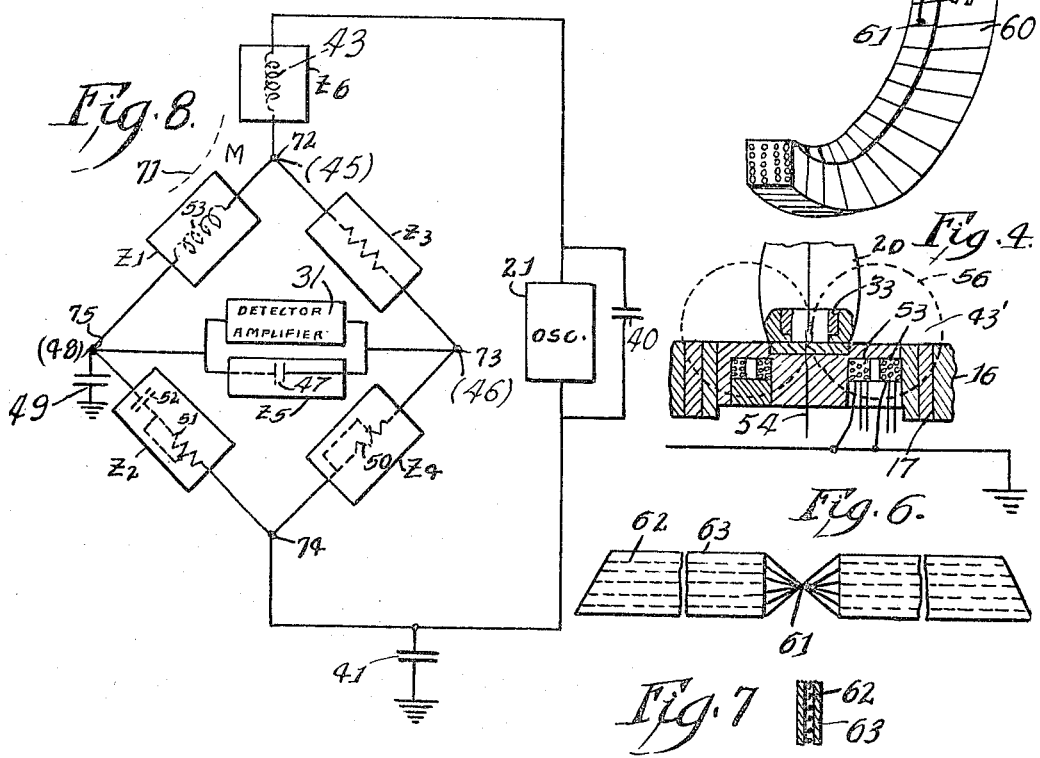

United States Patent Office 3,284,082
Patented Nov. 8, 1966

3,284,082
PIN DETECTION BRIDGE CIRCUIT WITH RESONATING DETECTION LEG AND REACTIVE DIAGONAL ELEMENTS
Sampson Isenberg, Albert E. Shaw, and Robert J. Moon, Chicago, Ill., assignors to Brunswick Corporation, a corporation of Delaware
Filed June 24, 1963, Ser. No. 289,864
5 Claims. (Cl. 273—52)

This invention relates to a pin detection system and more specifically to a bowling pin detection system incorporated in a bowling alley for determining the presence or absence of bowling pins.

It is a general object of the invention to provide a new and improved pin detection apparatus.

A further object of this invention is to provide a new and improved apparatus for distinguishing between the presence and absence of standing pins on a bowling alley and giving a signal indicative of pin fall including a novel bridge circuit having balanced and unbalanced conditions determined by the presence or absence of a standing bowling pin within a predetermined area.

A still further object of this invention is to provide a pin detection system for a bowling alley having a plurality of predetermined pin spots including a pair of closely spaced coils located at each pin spot and pins each having a construction adapted to affect the inductive coupling of the coils when standing on the spot or adjacent the spot as compared to the coupling existing in the absence of a pin or in case of a fallen pin at the spot. There is further provided an alternating current bridge which includes one of the coils in one leg thereof and which has a balanced and unbalanced operating condition. A source of alternating current signal is coupled through the other coil to the other diagonal of the bridge. A detection system is coupled across one diagonal of the bridge circuit and a capacitor is coupled across the detection system and resonates with the first coil when the bridge is in the unbalanced condition.

An important advantage of the detecting means disclosed herein is the provision for emphasizing the unbalanced condition of the bridge circuit due to the resonant conditions in the bridge circuit. The circuit may be adjusted to be balanced in the absence of a standing pin, insignificantly unbalanced in the presence of a fallen pin and significantly unbalanced in the presence of a standing pin, or vice versa, unbalanced in the absence of a pin and balanced in the presence of a standing pin, but the former is preferable due to the difficulty of providing pins of identical effect for the balanced condition.

It is a further object of this invention to provide a pin detection system for a bowling alley which includes a plurality of pin spots wherein one oscillator provides the necessary driving signal for a plurality of bridge circuits through a switching means and which has only one amplifier and detection circuit coupled to the output of the bridge circuits for detecting the presence or absence of pins through a scanning means which selectively samples each individual pin spot position.

Although the embodiment herein will be discussed wherein the bridge circuit is in the balanced condition when a pin is present at the pin spot, it is to be understood that with proper selection of components, the balanced condition could be represented by the absence of a pin at the pin spot.

Other objects and advantages will become readily apparent from the following detailed description taken in connection with the accompanying drawings, in which:

FIG. 1 is a top view of a portion of a bowling alley;

FIG. 2 is a block diagram and sectional view along line A—A in FIG. 1 of one embodiment of this invention;

FIG. 3 is a wiring diagram of a bridge circuit in the embodiment shown in FIG. 2;

FIG. 4 shows an alternate coil arrangement;

FIG. 5 depicts one coil partly in cross section usable in this invention;

FIG. 6 shows the Faraday shield construction used in FIG. 5; and

FIG. 7 is an end view of the Faraday shield;

FIG. 8 is the electrically equivalent circuit of FIG. 3.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring now to the drawings in more detail, FIG. 1 illustrates the pit end of a typical bowling alley including gutters 15 on opposite sides of an alley 16 providing an upper surface on which pins may be set and along which a ball may be rolled at the pins. Normally, the alley is comprised of a plurality of laminated side by side wood strips 17. It is intended that pins would be initially set on alley 16 at the ten pin spots 18 represented by fiber discs or the like shown in solid line circles. The circular areas 19 in dashed line shown about each pin spot 18 indicate a sensing device associated with each pin spot and carried by a circular alley insert 19a carrying disc 18. A sectional view along line A—A through four of the pin spots is illustrated in the upper portion of FIG. 2, and includes four bowling pins 20 in place on pin spots 18.

Referring now specifically to FIG. 2, which illustrates diagrammatically the general relationship of parts, an oscillator 21 has its output connected through an indexable three gang switch 22 having switch levels or wafers 23, 24 and 25. A dashed line 26 represents the mechanical coupling between the three switch wafers and indicates that there is a fixed relation between the switch positions.

Switch wafer 23 receives the output of oscillator 21 and consecutively energizes the various sensing means 19 adjacent each pin spot 18. The switch wafer 23 also selectively places the output of the sensing means 19 across bridges 27, 28, 29 and 30, respectively.

Switch wafer 24 selectively receives the output from the bridge circuits and energizes an amplifier and detector circuit 31 for producing an indication of presence or absence of a bowling pin. Switch wafer 25 selectively energizes individual indicator elements of indicator 32 in response to received pin presence or absence signals.

The individual type of indication is not important for an understanding of this invention and therefore has been presented in block form only. However, the indicating means of the Torresen Patents Nos. 3,011,785 and 3,109,650 are illustrative of the type of indicator that may be used in conjunction with this pin detecting system.

A reactance affecting means 33 is shown in the base of each pin and may be of the type shown in application Serial No. 79,399 of Isenberg, Shaw and Moon filed December 29, 1960 and assigned to the assignee of the present application and now Patent No. 3,237,945. In varying the permeability of the two coils and hence the effective mutual coupling it is desirable to secure the greatest distinction between the presence and absence of pins. Therefore, a flattened ring insert 33 has been provided in the pin so that when the pin is standing the greatest effect on the permeability of the two coils is accomplished. When the pin is down or in a horizontal position this ring assumes a substantially vertical position and has a minimum effect upon the mutual inductance of the coils should the pin remain close to the pin spot area of the bowling alley.

A block 34 attached to switch wafers 23, 24 and 25 by dashed lines 26 schematically represents other bridge circuits attached to other pin spot positions on bowling alley 16.

FIG. 3 shows the electrical components and connections of the individual bridge circuits 27, 28, 29 and 30 of FIG. 2. The output of oscillator 21 which is coupled through switch wafer 23 and transformer 37 is developed across a capacitor 40 one side of which is coupled to ground through a capacitor 41. A lead 42 joins the other side of capacitor 40 to one side of a coil 43 located adjacent the pin spot position 18 in alley 16. The other side of coil 43 is coupled through a lead 44 to a junction 45 and to a junction 46. A capacitor 47 is connected between junction 46 and a junction 48 which in turn is coupled to ground through a capacitor 49. The common point between capacitors 40 and 41 is coupled to a common point between a variable resistor 50 and a variable resistor 51. A capacitor 52 joins resistor 51 to junction point 48 and the other side of resistor 50 is directly coupled to junction point 46.

A second coil 53 located below coil 43 and closely adjacent thereto has a common axis 54 with coil 43. One terminal of coil 53 is connected to junction point 45 and the other to junction 48. In one successful embodiment of the invention the co-efficient of coupling between the two coils was approximately 50%. This figure was arrived at by consideration being given to the size of the balancing components in the bridge circuit. It is to be understood that the signal supplied by oscillator 21 through transformer 37 to the coils 43, 53 is developed across each individual coil. Depending upon the connections of the coils and the direction of current therethrough the individual signals developed therein may have an effective aiding or opposing relationship to each other, cumulative or in opposition. In addition, the bridge sensitivity may be affected by the selection of the coils with respect to their connections in the bridge circuit and the coil's relative positions in the floor.

The output of the bridge circuit is developed between junction points 46 and 48 which are connected through switch wafer 24 to the amplifier, detector and indicator circuits 31 and 32.

FIG. 4 shows an alternate placement of coils 43 and 53 adjacent the pin spot 18. In this instance the coils have a common axis 54 but coil 43' has a smaller radius than that of coil 53' and is located inside of coil 53'. The dashed circular lines 56 in FIGS. 3 and 4 represent the inductive coupling of the circuit which with the pin in position include the reactance affecting device 33. In this instance device 33 is a ring of paramagnetic material located in the base of pin 20.

FIG. 5 shows the physical construction of the coils 43, 53, 43', and 53' used in the embodiment of FIGS. 3 and 4. The coil is of a ring shape wound in the usual manner and has a Faraday shield 60 wound thereabout. The shield, in this instance as shown in greater detail in FIGS. 6 and 7 consists of six wires 62 shown in dashed line in FIG. 6 held in paced relationship by the material 63 such as Mylar. Wires 62 are joined at a common point 61 and the Faraday shield is made in two sections for ease of assembly. Point 61 is shown grounded to lead 64 in FIG. 5 which is joined to the shielding cable 65 on cable 66. FIG. 7 shows the end view of the Faraday shield of FIG. 6.

The Faraday shield is shown schematically in FIG. 3 by the circles 67 and 68 and is connected to ground potential.

FIG. 8 shows the electrically equivalent bridge circuit of FIG. 3 which includes oscillator 21, detector-amplifier 31 and impedances Z1, Z2, Z3, Z4, Z5 and Z6. Impedances Z1, Z2, Z3 and Z4 are shown in the conventional bridge configuration which has one diagonal in a horizontal position, containing the detector circuit 31, while across the other diagonal, in this case in a vertical position, the input from the oscillator is connected through impedance Z6. Impedance Z5 is shown coupled parallel in relationship with detector 31 while the "M" represents, by the dashed line 71, the effective mutual inductance when the pin is on the pin spot position.

Impedance Z6 represents that of coil 43, Z1 that of coil 53, Z2 that of capacitor 52 and resistance 51, Z4 that of resistance 50, Z5 that of capacitor 47 and Z3 which is equal to zero ohms, is inserted to properly represent the bridge circuit. These components are shown in dashed lines in FIG. 8.

For convenience the junctions of the bridge are numbered 72, 73, 74 and 75. It is to be noted that junction 72 corresponds to 45, 73 to 46 and 75 to 48 in FIG. 3.

In operation, when a bowling pin is properly placed upon the pin spot, the bridge circuit of FIG. 8 is in balance. The variable resistances 50 and 51 are provided for this adjustment. It is to be understood that with proper selection of resistances it is possible to replace the variable resistances with fixed components.

The oscillator 21 develops an alternating current signal of a predetermined frequency and applies it through impedance Z6 across one diagonal of the bridge to the junctions 72 and 74. The balance of the impedances in response to the well known bridge formula.

$$Z1 \times Z4 = Z2 \times Z3$$

results in zero potential being developed across the other diagonal of the bridge circuit between junctions 73 and 75. Thus, no current flows and the detector registers no indication. The presence of "M" caused by the presence of the pin maintains the bridge in a balanced condition through its effect on the impedance Z1.

Removing "M" which is equivalent to the bowling pin being struck by a bowling ball and removed from its position causing Z1 to change its effective impedance and results in unbalancing the bridge. Z5 whose value has been selected so that it is in resonance with Z1 at the oscillator frequency has a voltage developed across it due to the unbalance of the circuit between junctions 73 and 75. The resonant conditions between coil 43 as represented by Z1 and capacitor 47 as represented by Z5 maximizes the impedance of the circuit and maximizes the voltage developed between junctions 73 and 75.

Capacitors 41 and 49 aid in establishing the proper operating conditions of the bridge circuit by counteracting the effects of inter-coil capacities and the capacities between the coils and the Faraday shields. In addition they remove unwanted signals from the bridge circuit which are received as noise.

Thus, a novel bridge circuit has been provided which effectively amplifies the unbalanced condition of its operation and provides an output which is of greater magnitude than would otherwise be possible.

We claim:

1. A pin detection system for use in conjunction with a bowling alley having a pin spot comprising: a reactive element located at said pin spot; a pin having a construction adapted to affect the reactive element when in position on said pin spot; an alternating current bridge circuit including said reactive element in one leg thereof and having balanced and unbalanced operating conditions; a detection system coupled across one diagonal of said bridge circuit; a source of alternating current signal coupled across the other diagonal of said bridge circuit; and a reactive device coupled across said detection system and resonating with said reactive element when said bridge circuit is in the unbalanced condition.

2. A pin detection system for use in conjunction with a bowling alley having a pin spot comprising: a pair of closely spaced reactive elements located at said pin spot; a pin having a construction adapted to affect the reactive elements when in position on said pin spot; an alternating current bridge including one of said reactive elements in one leg thereof and having balanced and unbalanced conditions; a detection system coupled across one diagonal of said bridge circuit; a source of alternating signal coupled through the other reactive element across the other diagonal of said bridge circuit; and a reactive device coupled across said detection system and resonating with said one reactive element when said bridge circuit is in the unbalanced condition.

3. A pin detection system for use in conjunction with a bowling alley having a plurality of pin spot positions comprising: a plurality of reactive elements at least two of which are located at each pin spot; a plurality of pins having a construction adapted to affect the reactive elements at each pin spot when in position on said pin spots; a plurality of alternating current bridges individually including at least one of said reactive elements in one leg thereof and having balanced and unbalanced operating conditions; a detection system, means sequentially coupling the detection system across one diagonal of each of said bridges in a predetermined order; a source of alternating current signals, means sequentially coupling source across the other diagonals of said bridges in said predetermined order; and a plurality of reactive devices individually coupled across said one diagonal of each bridge and resonating with said reactive element in said individual bridges when said bridges are in the unbalanced condition.

4. A pin detection system for use in conjunction with a bowling alley having a pin spot comprising: a pair of closely spaced coils located at said pin spot; a pin having a construction adapted to affect the inductive coupling of said coils when in position on said pin spot; an alternating current bridge including one of said coils in one leg thereof and having balanced and unbalanced operating conditions; a detection system coupled across one diagonal of said bridge circuit; a source of alternating current signal coupled through said other coil across the other diagonal of said bridge; and a capacitor coupled across said detection system and resonating at the frequency of said alternating current signal with said one coil when said bridge is in the unbalanced condition.

5. A pin detection system for use in conjunction with a bowling alley having a pin spot comprising: a pair of closely spaced coils located at said pin spot; a pin having a construction adapted to affect the inductive coupling of said coils when in position on said pin spot; an alternating current bridge including one of said coils in one leg thereof and having balanced and unbalanced operating conditions; a detection system coupled across one diagonal of said bridge circuit; a source of alternating current signal coupled through said other coil across the other diagonal of said bridge; and a capacitor coupled across said detection system and resonating with said one coil when said bridge is in the unbalanced condition.

References Cited by the Examiner

UNITED STATES PATENTS

| | | | |
|---|---|---|---|
| 1,870,181 | 8/1932 | Mallory. | |
| 1,942,575 | 1/1934 | Shapiro | 174—35 |
| 2,819,447 | 1/1958 | Harmon | 324—41 |
| 2,980,424 | 4/1961 | Sanders et al. | 273—43 |
| 3,011,785 | 12/1961 | Torresen | 273—52 X |
| 3,093,375 | 6/1963 | Shaw et al. | 273—52 |
| 3,099,447 | 7/1963 | Isenberg et al. | 273—52 |
| 3,142,984 | 8/1964 | Harmon et al. | 324—41 |

FOREIGN PATENTS 366,228    1/1963    Switzerland.

DELBERT B. LOWE, *Primary Examiner.*

ANTON O. OECHSLE, *Examiner.*